(12) United States Patent
Madrahalli et al.

(10) Patent No.: US 8,699,346 B2
(45) Date of Patent: Apr. 15, 2014

(54) METHOD AND SYSTEM FOR OPTICAL NETWORK SMART TIMER MANAGEMENT VIA DELAY MEASUREMENT BETWEEN SPANS

(75) Inventors: Vagish Madrahalli, Woodstock, GA (US); Jeffrey Scott Moynihan, Cumming, GA (US); Richard Conklin, Cumming, GA (US); Matt Connolly, Canton, GA (US)

(73) Assignee: Ciena Corporation, Hanover, MD (US)

( * ) Notice: Subject to any disclaimer, the term of this patent is extended or adjusted under 35 U.S.C. 154(b) by 703 days.

(21) Appl. No.: 12/938,904

(22) Filed: Nov. 3, 2010

(65) Prior Publication Data

US 2012/0106950 A1    May 3, 2012

(51) Int. Cl.
*H04L 12/26* (2006.01)
(52) U.S. Cl.
USPC .......................................................... 370/236

(58) Field of Classification Search
None
See application file for complete search history.

(56) References Cited

U.S. PATENT DOCUMENTS

| | | | | |
|---|---|---|---|---|
| 5,774,479 | A * | 6/1998 | Lee et al. | 714/749 |
| 2005/0288012 | A1* | 12/2005 | Morgan | 455/428 |
| 2012/0026869 | A1* | 2/2012 | Wang et al. | 370/230 |

* cited by examiner

*Primary Examiner* — Raj Jain
(74) *Attorney, Agent, or Firm* — Muncy, Geissler, Olds & Lowe, P.C.

(57) ABSTRACT

A method and system for determining timers in a High Level Data Link Control (HDLC) Traffic Manager (HTM) state machine are disclosed. According to one aspect, the invention provides for determining a transit delay between two nodes by sending a first packet having a delay measurement byte to a second node that is on a link between the first node and the second node. A measured delay value is determined based on the delay between a time of sending the first packet to the second node and receiving a second packet from the second node. The timer values of the HTM state machine are set based on the measured delay value.

20 Claims, 4 Drawing Sheets

METHOD AND SYSTEM FOR OPTICAL NETWORK SMART TIMER MANAGEMENT VIA DELAY MEASUREMENT BETWEEN SPANS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to communication networks, and more particularly to a method and system for determining timer values for synchronization between a master node and a slave node in a communication network.

BACKGROUND OF THE INVENTION

In Automatically Switched Optical Networks (ASON) and Generic Multi-Protocol Label Switching (GMPLS) networks, in-band control plane communication is used for routing and signaling. The integrity of the in-band communication channel is often dependent on the state of the routed circuit that carries the in-band communication control signal. This is true, for example, in the case of a G.709 compliant Optical Data Unit (ODUk) circuit that uses the General Communication Channel (GCC). In this case, the GCC is part of the ODUk/Optical Transport Unit (OTUk) frame and can derive its timing from the ODUk circuit.

During connection establishment or connection tear down, the timing basis must switch from a local timing source to timing based on timing information in the payload of a packet in the case of connection establishment, and from payload timing to the local timing source in the case of connection tear down. This is referred to as BITS-to-GAPS or GAPS-to-BITS switching, respectively. If the ODUk circuit is switched or replaced by a maintenance signal, a discontinuity in the start-of-frame location, referred to as frame slip, is inevitable. Other discontinuities in the ODUk/OTUk frame can arise from hardware reconfiguration, which occurs to support different signal rates. For example, hardware may be re-configured to support ODUj circuits on ODUk lines.

Discontinuities or frame slips can result in loss of control plane packets or in loss of control plane connectivity. Certain protocols have been introduced to address this problem. These protocols are bi-directional since they must ensure that both ends of an Optical Transport Network (OTN) link are in an operational state and capable of sending and receiving control plane messages. Typically, these protocols require buffering or re-transmission of control plane messages until an acknowledgement is received, or a timer expires. Timers must be set long enough to allow for round trip delay on the OTN link. Current solutions assume a worst case round trip delay or provide a manually settable value for the timer.

Using timer and retry attempts at an application layer results in slower mesh restoration and slower dynamic connection setup time, because they involve using pre-defined timer durations between spans that are longer than necessary. Identifying an accurate timer value is often difficult, so network operators tend to select timers based on worst case delays. Therefore, it is desirable to have a method and system that provides efficient timer implementation.

SUMMARY OF THE INVENTION

Methods and systems for determining timers in an High Level Data Link Control (HDLC) Traffic Manager (HTM) state machine are disclosed. According to one aspect, the invention provides a method that includes sending from a first node a first packet having a delay measurement byte to a second node that is on a link between the first node and the second node. The method also includes receiving a second packet with the delay measurement byte from the second node. The delay measurement byte sent by the second node is adjusted by the second node to indicate its receipt by the second node. A measured delay value is determined. The measured delay value is the delay between a time of sending the first packet to the second node and receiving the second packet from the second node. The measured delay value is determined by the hardware of the first node. Upon determining the measured delay value, timer values of the HTM state machine are set based on the measured delay value.

According to another aspect, the invention provides a first node in an optical network that functions to determine HTM timer values based on a packet transit delay between the first node and a second node. The first node includes an HTM state machine configured to recover from a frame slip event. The HTM state machine transitions between states based on timer values calculated from the transit delay. A transmitter at the first node sends a first packet having a first measurement byte to the second node. A receiver at the first node receives a second packet having a second measurement byte. The second measurement byte is obtained by modifying the first measurement byte at the second node. The first node also has a processor to determine the transit delay as the delay between sending the first measurement byte and receiving the second measurement byte, and calculating the timer values based on the transit delay.

According to yet another aspect, the invention provides a method of determining timer values for an HTM state machine in a node of an optical communication network, where the HTM state machine is configured to recover from a frame slip event. The method includes sending a first packet to a remote node in the network and receiving a second packet from the remote node prior to expiry of a first delay value. The method includes determining a second delay value between the time of sending the first packet and receiving the second packet. The method also includes setting timers of the HTM state machine based on the second delay value

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it is noted that the embodiments reside primarily in combinations of apparatus components and processing steps related to implementing a system and method for determining timer values for an HTM state machine. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
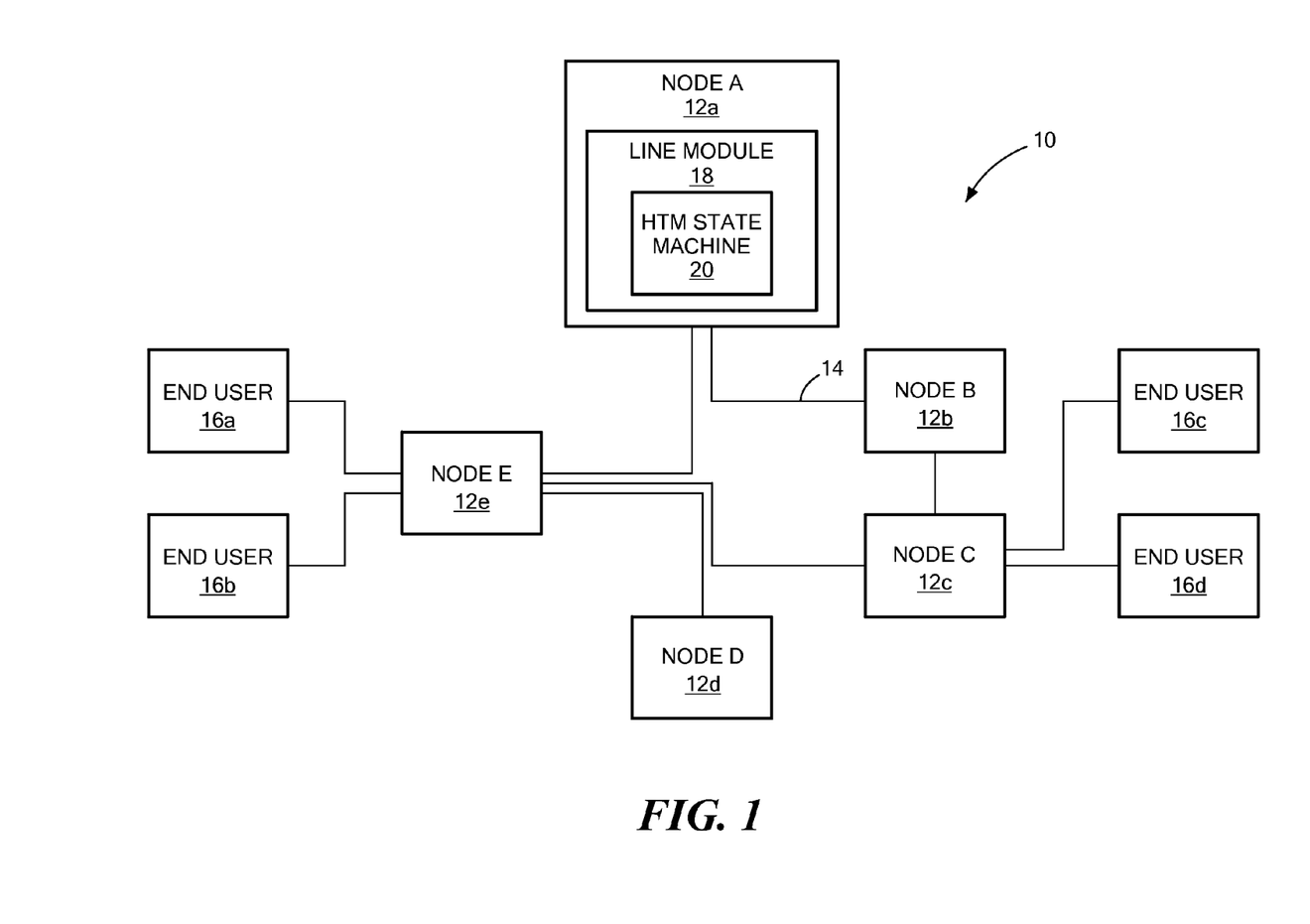
FIG. 1 is a diagram of an exemplary communication network constructed in accordance with the principles of the present invention.

Referring now to the drawing figures in which like reference designators refer to like elements, there is shown in FIG. 1 a block diagram of an exemplary communication network constructed in accordance with the principles of the present invention, and designated generally as "10". The communication network 10 includes nodes 12a-e (referred to collectively herein as nodes 12). In particular, node A 12a and node B 12b are connected by a link 14. A fewer or greater number of nodes may be included in a typical communication network. The nodes may be servers, routers, switches or other network systems or components found in a typical communication network such as an Optical Transport Network (OTN). For example, node E 12e may be a switch in a switching office that serves end users, such as end users 16a and 16b. As a further example, nodes A 12a, B 12b, and D 12d may be routers, and node C 12c may be a switch connected to end user devices 16c and 16d. Each node has a line module (LM) 18 and a High Level Data Link Control (HDLC) Traffic Manager (HTM) 20, as described below.

Suppose, for example, that end users 16a and 16c are clients communicating Ethernet traffic over the communication network 10. Data is sent from the client 16c to the client 16a through the network 10 and data is sent from the client 16a to client 16c through the network 10. Suppose, further, that a route for carrying this Ethernet traffic between end users 16a and 16c includes node A 12a, node B 12b, and link 14. Before the Ethernet traffic is carried in the network, an OTN tunnel must be established from node A 12a to node B 12b. During this establishment, the existing traffic on the OTN link 14 should not be disrupted. Also, any failure of the OTN link 14 should result in restoration of the failed OTN tunnels to a next best path without disrupting the existing Ethernet traffic on the OTN link 14.

Assume, for example, that an ODU2 tunnel is being set up on the link 14. During establishment of the OTN tunnel, cross connect provisioning on each node A 12a, B 12b occurs independently at the control plane level. During this time, a BITS to GAPS timing mode change occurs and the control plane should ensure that frame slip problems are minimal and that the control plane is not impacted by a frame slip.

Each OTU-k Trail Termination Point (TTP) has either an ODU-k Connection Termination Point (CTP) or an ODU-k TTP. When the OTU mode changes from ODU-k CTP mode to ODU-k TTP mode, or vice versa, the timing basis changes from BITS to GAPS. This timing basis change causes an OTU frame slip. The OTU frame slip has the side effect that the OTU-k overhead, including GCCO, may be corrupted. The goal of a High Level Data Link Control (HDLC) Traffic Manager (HTM) state machine described below is to minimize this side effect by coordinating the mode switch with a peer OTU interface. This coordination allows the HTM to ensure that packets are not dropped from a High Level Data Link Control (HDLC) that is using the GCC bytes when the mode switch is applied to the OTU-k. The HTM state machine ensures that packets are not transmitted during this window and it queues the HDLC traffic during the mode switch operation.

The OTU-k mode switch is controlled by an application in a Line Module (LM) herein referred to as a Facility Object Manager (FOM). The FOM application handles a CTP/TTP provisioning request to create or delete an ODU-k CTP/ODU-k TTP on an OTU-k TTP. The FOM supports two methods for provisioning TTPs: a slow path request via a facility database and a fast path request via a Switch Control. TTPs are created via the slow path if the TTP is created manually by the user or automatically if the control plane creates this TTP, which would arrive via a switch core application. TTPs are created via the fast path only if the TTP is created automatically by the system. Note that automatically created TTPs are created by the fast path mechanism and the slow path mechanism. The fast-path-create mechanism operates in real time, and the fast path mechanism will typically trigger the TTP creation on the LM. Subsequently, the control module will send the complete facility provisioning data via a facility database, which will arrive via the slow path to the LM to provision the facility provisioning data.

The Facility Object Manager (FOM) invokes the HTM state machine when an OTU mode change is applied on an OTU interface that has a control plane interface (a.k.a. a non-drop-side interface/non-client-side interface). The FOM invokes the HTM state machine for both slow path and fast path requests; however, the HTM state machine is optimized for the fast-path-create requests. The HTM state machine assumes that the peer interface will be ready to switch within a short time frame of between 25 ms and 100 ms. The main use of the HTM state machine is to mask interrupts during switching windows to ensure that frame slip does not result in triggering the control plane to malfunction on that particular interface.

When instructed, the HTM state machine coordinates with an adjacent node's HTM state machine in its LM via a sequence of control messages to ensure that a frame slip condition is not propagated to the adjacent node. The HTM state machine performs a set of operations that include a) mode switch with the peer HTM state machine, b) flush all outgoing local HDLC queues (one for each priority), c) wait for the peer HTM state machine to flush its queues, d) queue HDLC transmit requests during this transition, e) communicate to the FOM on remote switching as well as local mode transitions after receiving responses from the remote HTM state machine, f) reconnect the HDLC channel for regular transmission and g) transmit all HDLC frames in the local HDLC queue that were queued while the mode change was applied. Note that the HTM state machine must allow HDLC traffic to flow normally if the FOM has requested a mode switch but the peer HTM has not acknowledged the mode setup request. The process of the HTM state machine is controlled via local timers for each state transition, which, in the prior art, are set manually. According to embodiments described herein, the timer values are based on a measured delay between a master node and a peer or slave node.

Figure 2:
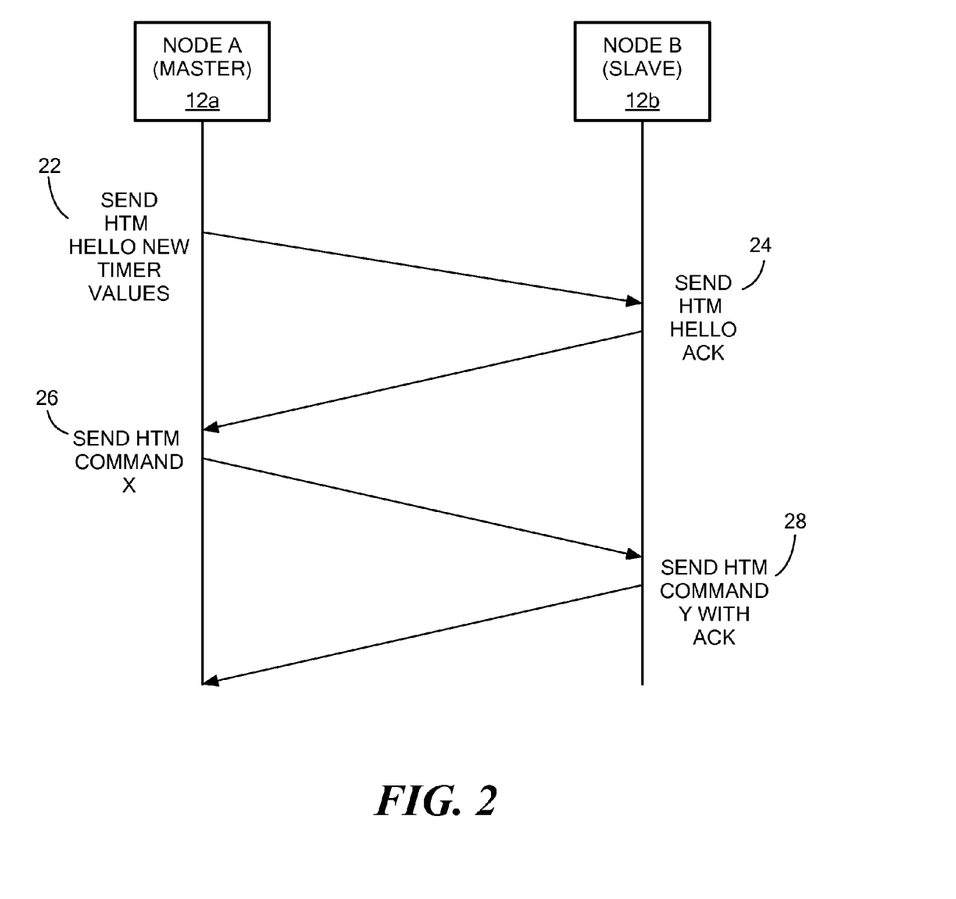
FIG. 2 is a diagram of an exchange of messages between a master node and a slave node.

FIG. 2 is a diagram of communication flow between a master node, such as node A 12a and a slave node or peer node such as node B 12b. The master/slave relationship may be based on which node has the higher node Id on a particular control plane interface. Each of the master node and the slave node may be a switch or a router in a communication network. Upon measurement of the latency between the two nodes, which is done via Direct Measurement (DM) overhead bytes on the OTU layer, the master node A 12a sends an HTM Hello message with new timer values to the slave node B 12b (22). The measurement of the latency is performed by use of an overhead byte reserved for a delay measurement. Latency is measured by inserting a transition in a specified bit of a reserved overhead byte. This byte is sent from the master node A 12a to the slave node B 12b and then back to the master node A 12a. The master node A 12a determines the latency by counting a number of intervening frames between transmitting the reserved byte and receiving it from the slave node B 12b.

Upon sending the HTM Hello message, the master node A 12a starts a timer with an ending value of two times the measured delay (latency). The master node A 12a expects the slave node B 12b to send a Hello acknowledgement before expiry of the timer. If the expiry of the timer occurs before the receipt of the Hello acknowledgement from the slave node B 12b, then the master node A 12a sends another HTM Hello message and the timer is restarted. The master node A 12a will send the Hello message a predetermined number of times, e.g., three times, before quitting its attempts to communicate the Hello message with the new timer values to the slave node B 12b. If the master node A 12a does not receive the Hello acknowledgment message from the slave node B 12b after the predetermined number of tries, then the master node A 12a will update its local timers (that are used for its state machine) with the measured delay value.

When the slave node B 12b receives the new timers in the HTM Hello message, it updates its local timers with the new values from the master node A 12a and sends the HTM Hello Acknowledgement message to the master node A 12a (24). If the HTM hello message is not received but the slave node B 12b receives the new timer values in a mode change command sent by the master node A 12a (26), then the slave node B 12b will update its timers and send an acknowledgement signal to the master node A 12a via the slave node's mode change acknowledgement command (28).

Timers of an HTM state machine are determined based on the delay measurement to recover from a frame slip event. A frame slip event may result from a change of protocol of an optical signal to be transported via the optical communication network. For example, the frame slip event may result from a change of protocol from an OTUk signal to an ODUk signal. As another example, the frame slip event may result from a change from an ODUk signal to an ODUj signal, where k is not equal to j. As yet another example, a frame slip event may result from a mode change from a Trail Termination Point signal to a Connection Termination Point signal.

Figure 3:
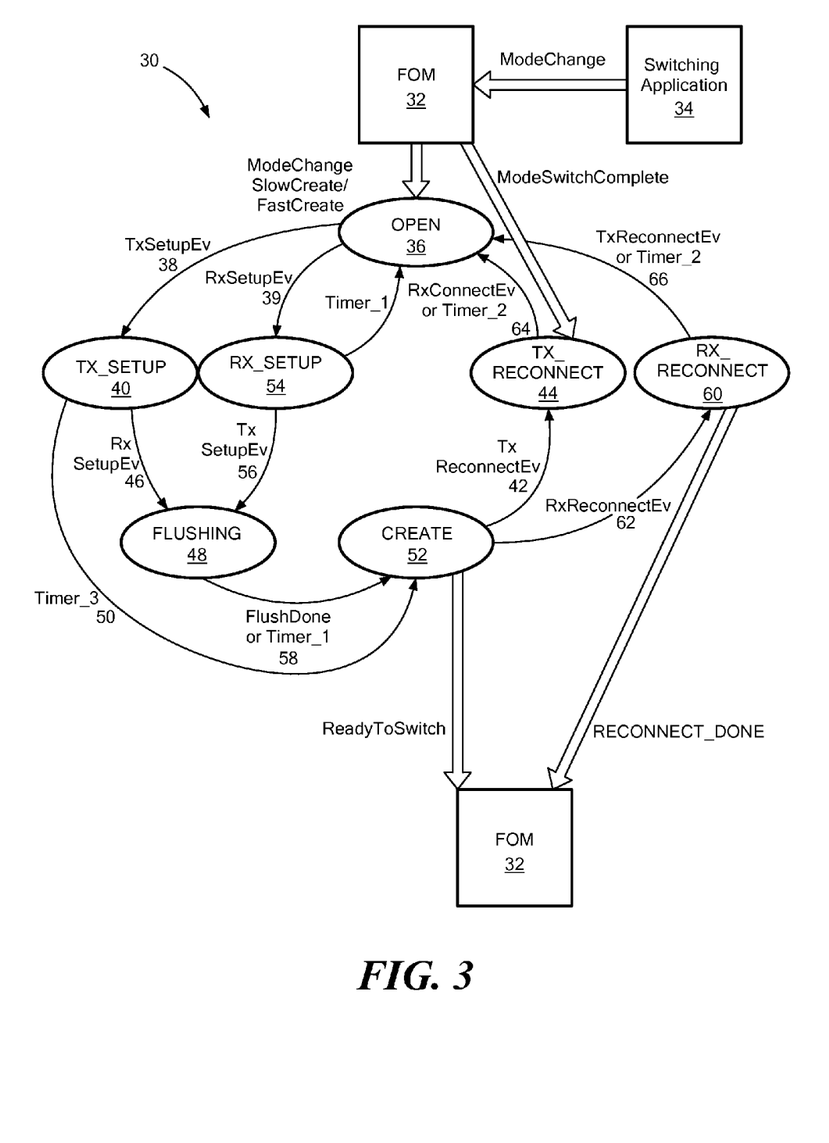
FIG. 3 is a diagram of an exemplary state machine to avoid message loss during an OTN timing error during connection setup.

The timers are used by a High Traffic Manager (HTM) state machine, such as HTM state machine 20, to create requests to avoid message loss during an OTN timing glitch. An example of such a state machine 30 is depicted in FIG. 3. The HTM state machine is implemented by the master node, e.g., node A 12a, to recover from a frame slip event. A Facility Object Manager (FOM) 32 receives an initiating signal from a switching application 34. A purpose of the switching application 34 is to program the master node FOM 32 for fast TTP provisioning before timeslots are provisioned on the OTU TTP. The switching application 34 is a software module that is part of the line module (LM), such as the LM 18, and it coordinates with a control module (CM) (not shown) for switch programming. The FOM application 32 is also a software module located in the LM which interacts with a hardware interface for programming hardware registers.

The FOM 32 communicates with the HTM state machine which is initially in the OPEN State 36 to perform a mode change. An HTM state machine at the second node can send a TX_SETUP message 38 to the HTM state machine 30, and upon receipt, the HTM state machine 30 will transition from the OPEN state 36 to the TX_SETUP state 40. Alternatively, the HTM state machine may receive a RXSETUP message 39 from the second node, and the HTM state machine will transition from the OPEN state 36 to the RX_SETUP state 54.

When in the TX_SETUP state, upon receipt of a RXSETUP message 46, the HTM state machine will transition to the FLUSHING state 48. The purpose of the FLUSHING state 48 is to flush the local HDLC queues. If the RXSETUP message is not received by the expiration of a third time, Timer_3, the HTM state machine will transition to the CREATE state 52. The purpose of the CREATE state 52 is to instruct the FOM 32 to proceed with the mode change operation or to complete its programming in hardware. When in the CREATE state 52, the FOM 32 is informed that a switch is ready to switch.

When in the RX_SETUP state, upon receipt of a TXSETUP message 56, the HTM state machine 30 will transition to the FLUSHING state 48. If the TXSETUP message 56 is not received before the expiry of a first timer Timer_1, the HTM state machine transitions back to the OPEN state 36. When in the FLUSHING state 48, if flushing is completed or a timer, Timer_1, expires, the HTM state machine transitions to the CREATE state 52.

When in the CREATE state 52, the HTM state machine 30 sends a ReadytoSwitch signal to the FOM 32. From the CREATE state 52, the HTM state machine may send a TXRECONNECT message 42 to the second HTM machine and the HTM state machine 30 transitions to the TX_RECONNECT state 44. The purpose of the TX_RECONNECT state 44 is to instruct the second HTM application to unmask any interrupts that were masked during this programming window. Alternatively, from the CREATE state 52, the HTM state machine 30 may send a RXRECONNECT message 62 to the second HTM state machine, and the HTM state machine 30 transitions to the RX_RECONNECT state 60. The purpose of the RX_RECONNECT state 60 is to cause the FOM 32 to unmask interrupts at the master node LM.

When in the TX_RECONNECT state 44, the HTM state machine may receive ModeSwitchComplete signal from the FOM 32. Upon receipt of a RX_RECONNECT message from the remote HTM state machine, or the expiry of timer, Timer_2, the HTM state machine 30 transitions back to the OPEN state 36. When in the RX_RECONNECT state 60, upon receipt of a TX_RECONNECT message 66, or the expiry of the timer, Timer_2, the HTM state machine transitions to the OPEN state 36.

Thus, when a node is in a TX_SETUP state and receives a remote TX_SETUP message, then it transitions to the FLUSHING state. When the node is in the OPEN state and receives a remote RX_SETUP message, then the node transitions to the RX_SETUP state. When a node receives an indication of a mode change from the FOM of the node, then, if the node is in the OPEN state, the node transitions to the TX_SETUP state and sends a TX_SETUP message to the other node. When a node receives an indication of a mode change from the FOM of the node, then, if the node is in the RX_SETUP state, the node transitions to the FLUSHING state and sends a FLUSH message to the other node. After flushing the queues, the node transitions from the FLUSH state to the CREATE state.

If the node receives a remote TX_RECONNECT message and the node is in the CREATE state, then the node transitions to the RX_RECONNECT state. If the node receives a remote TX_RECONNECT message and the node is in the TX_RECONNECT state, then the node transitions to the OPEN state. If a node receives an FOM indication for mode completion and the node is in the CREATE state, the node moves to the TX_RECONNECT state and sends a TX_RECONNECT message to the other node. If, however, the node is in the RX_RECONNECT state, the node moves to the OPEN state. The timers are used to cause transition to a next state when a message is not received from the remote node before expiration of the applicable timer.

Figure 4:
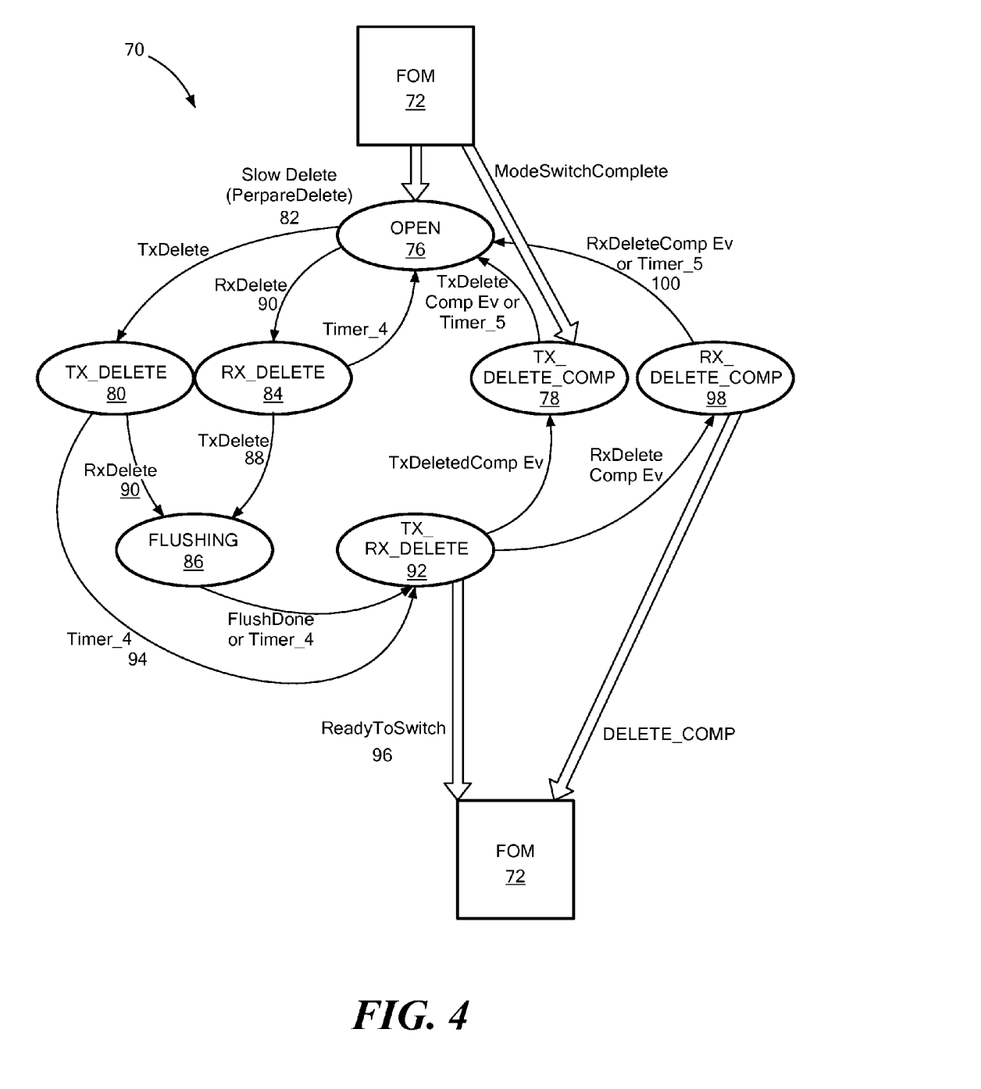
FIG. 4 is a diagram of an exemplary state machine to avoid message loss during an OTN timing error during connection tear down.

FIG. 4 is a diagram of a HTM state machine 70 used to delete requests to avoid message loss during an OTN glitch. Initially, the FOM 72 places the HTM state machine 70 in the OPEN state 76 in case of a slow delete, and in a TX_DELETE_COMP state 78 when a mode switch is completed. The purpose of the TX_DELETE_COMP state 78 is to instruct the FOM 72 to unmask a set of process interrupts. From the OPEN state 76, the HTM state machine transitions to a TX_DELETE state 80 when triggered by a TX_DELETE message from the remote HTM state machine. The purpose of the TX_DELETE state 80 is to send a message to the second HTM application so that the second HTM application can mask the interrupts during this window. Alternatively, the HTM state transitions to the RX_DELETE state 84 when triggered by a RxDelete message from the second HTM. The purpose of the RX_DELETE state 84 is to mask local interrupts. When in the RX_DELETE state 84, the HTM state machine transitions to a FLUSHING state 86 in response to a TX_DELETE event 88. The purpose of the FLUSHING state 86 is to flush any queued messages so that if there are any control plane messages queued in the master node, they are sent to the second node before the delete operation completes. Similarly, when in the TX_DELETE state 80, the HTM state machine transitions to the FLUSHING state 86 in response to a RX_DELETE event 90.

From the FLUSHING state 86, the HTM state machine transitions to a TX_RX_DELETE state 92 when flushing is complete or upon expiration of a fourth timer, Timer_4 94. The purpose of the TX_RX_DELETE state 92 is to instruct the FOM 72 to delete the local ODUk Object and reset the hardware registers. When in the TX_RX_DELETE state 92, a ready to switch signal 96 is sent to the FOM 72. From the TX_RX_DELETE state 92, the HTM state machine transitions to the TX_DELETE_COMP 78, this transition being triggered by a local node after completing a mode change request. The purpose of the TX_DELETE_COMP state 78 is to indicate to the remote HTM application that interrupts are to be unmasked. Similarly, from the TX_RX_DELETE state 92, the HTM state machine transitions to a RX_DELETE_COMP state 98, this transition being triggered by a RxDeleteComp message from the second node. The purpose of the RX_DELETE_COMP state 98 is to cause the FOM 32 on the local node to unmask interrupts at its side.

When in the RX_DELETE_COMP 98 state, a delete completed signal is sent to the FOM 72. From the TX_DELETE_COMP state 78 or from the RX_DELETE_COMP state 98, the HTM state machine transitions to the OPEN state 76 upon expiry of a fifth timer, Timer_5 100.

As an example, before updating the five timers based on the measured latency between the two nodes, the timers may have the following initial values:
Timer_1=100 milliseconds;
Timer_2=100 milliseconds;
Timer_3=5000 milliseconds;
Timer_4=150 milliseconds; and
Timer_5=150 milliseconds.

After the measured latency is determined, the five timers may be calculated from the measured latency according to the following formulas:

$$Timer\_1=2*(measured\ latency+15\ milliseconds),$$
where the 2 indicates a number of RxSetup or TxSetup messages;

$$Timer\_2=2*(measured\ latency+15\ milliseconds),$$
where the 2 indicates a number of RxReconnect or TxReconnenct messages;

$$Timer\_3=10*(measured\ latency+15\ milliseconds),$$
where the 10 indicates the total number of messages sent or received during this timer window;

$$Timer\_4=2*(measured\ latency+15\ milliseconds),$$
where the 2 indicates a number of RxDelete or TxDelete messages;

$$Timer\_5=2*(measured\ latency+15\ milliseconds),$$
where the 2 indicates a number of RxDeleteComplete or TxDeleteComplete messages.

Since the measured latency may be expected to be on the order of microseconds, the computed timer values will be relatively small compared to their initial values. This results in faster restoration times when a frame slip event occurs.

Thus, one embodiment is a method of determining timers for use by a HTM state machine in a network node in an optical communication network. The method includes sending from a first node A 12a a first packet having a delay measurement byte to a second node B 12b that is on a link 14 between the first node A 12a and the second node B 12b. The method also includes receiving a second packet with the delay measurement byte from the second node B 12b. The delay measurement byte sent by the second node B 12b is adjusted by the second node B 12b to indicate the measurement byte's receipt by the second node B 12b. A measured delay value is determined. The measured delay value is the delay between a time of sending the first packet to the second node B 12b and receiving the second packet from the second node B 12b. The measured delay value is determined by the hardware of the first node A 12a. Upon determining the measured delay value, timer values of the HTM state machine 20 are set based on the measured delay value.

The method may also include sending the timer values with a hello message to the second node B 12b for use in an HTM state machine of the second node B 12b. In some embodiments, the first node A 12a waits a predetermined amount of time to receive an acknowledgment message from the second node B 12b. The first node A 12a may resend the timer values with another hello message if the acknowledgement message is not received in a predetermined time interval.

The timer values of the HTM state machine may be calculated to prevent loss of messages transmitted over the optical communication network. For example, a first timer may be computed as twice the sum of the measured delay value and 15 milliseconds. A second timer may be computed as ten times the sum of the measured delay value and 15 milliseconds. Upon expiration of a timer value, the HTM state machine may transition from a first state to a second state. The first state may be a setup state and the second state may be an open state.

Another embodiment is a first node in an optical network that functions to determine HTM timer values based on a packet transit delay between the first node and a second node. The first node includes an HTM state machine configured to recover from a frame slip event. The HTM state machine transitions between states based on timer values calculated based on the transit delay. A transmitter at the first node sends a first packet having a first measurement byte to the second node. A receiver at the first node receives a second packet having a second measurement byte. The second measurement byte is obtained by modifying the first measurement byte at the second node. The first node also has a processor to determine the transit delay as the delay between sending the first measurement byte and receiving the second measurement byte, and calculating the timer values based on the transit delay.

The calculated timer values may be transmitted to the second node for use in an HTM state machine in a Line Module of the second node. The HTM state machine of the first node may transition from a first state to a second state in response to a setup event triggered by a command received from the second node. The HTM state machine of the first node may transition from the second state back to the first state upon expiry of a first timer determined based on the transit delay. In some embodiments, the HTM machine may transition from a first state to a second state in response to a delete event triggered by a command received from the second node. The HTM machine may transition from the second state back to the first state upon expiry of a second timer based on the transit delay.

Another embodiment is a method of determining timer values for an HTM state machine in a node of an optical communication network, where the HTM state machine is configured to recover from a frame slip event. The method includes sending a first packet to a remote node in the network and receiving a second packet from the remote node prior to expiry of a first delay value. The method includes determining a second delay value between the time of sending the first packet and receiving the second packet. The method also includes setting timers of the HTM state machine based on the second delay value.

Embodiments of the invention can take the form of an entirely hardware embodiment or an embodiment containing both hardware and software elements. In a preferred embodiment, the invention is implemented by the communication network nodes in software and hardware, which includes but is not limited to firmware, resident software, microcode, and the like.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of determining timers for use by an HDLC Traffic Manager (HTM) state machine in an optical communication network, the method comprising:
    sending from a first node a first packet having a delay measurement byte to a second node that is on a link between the first node and the second node;
    receiving a second packet with the delay measurement byte from the second node, the delay measurement byte being adjusted by the second node to indicate its receipt by the second node;
    determining a measured delay value between a time of sending the first packet to the second node and receiving the second packet from the second node, the measured delay value being determined by hardware of the first node; and
    setting timer values of the HTM state machine based on the determined measured delay value wherein a first timer is computed as 2 times the sum of the measured delay value and 15 milliseconds.

2. The method of claim 1, wherein the timer values are sent o the second node with a hello message.

3. The method of claim 2, wherein the first node sends the timer values with a second hello message to the second node if the acknowledgment message is not received from the second node during the predetermined amount of time.

4. The method of claim 1, wherein the first node waits a predetermined amount of time to receive an acknowledgment message from the second node.

5. The method of claim 1, wherein the timer values of the HTM machine are calculated to prevent loss of messages transmitted over the optical communication network.

6. The method of claim 1, wherein a second timer is computed as 10 times the sum of the measured delay value and 15 milliseconds.

7. The method of claim 1, wherein, upon expiry of a timer value, the HTM state machine transitions from a first state to a second state.

8. The method of claim 7, wherein the first state is a setup state and the second state is an open state.

9. A first node in an optical communication network, the node comprising:
    an HDLC Traffic Manager (HTM) state machine, the HTM state machine configured to recover from a frame slip event, the HTM state machine transitioning between states based on timer values calculated from a transit delay value;
    a transmitter, the transmitter sending a first packet having a first measurement byte to a second node;
    a receiver, the receiver receiving a second packet having a second measurement byte from the second node, the second measurement byte obtained by modifying the first measurement byte;
    a processor, the processor determining the transit delay value as the delay between sending the first measurement byte and receiving the second measurement byte, and calculating the timer values based on the transit delay value; and a first timer, the first timer being computed as 2 times the sum of the transit delay value and 15 milliseconds.

10. The first node of claim 9, wherein a frame slip event results from a change of protocol of a received optical signal.

11. The first node of claim 9, wherein the timer values are transmitted to the second node.

12. The first node of claim 9, wherein the HTM state machine transitions from a first state to a second state in response to a setup event triggered by a command received from the second node.

13. The first node of claim 12, Wherein the HTM state machine transitions from the second state back to the first state upon expiry of one of the timers.

14. The first node of claim 9, wherein the HTM state machine transitions from a first state to a second state in response to a delete event triggered by a command received from the second node.

15. The first node of claim 14, wherein the HTM state machine transitions from the second state back to the first state upon expiry of one of the timers.

16. The node of claim 9, further comprising a second timer, the second timer being computed as 10 times the sum of the transit delay value and 15 milliseconds.

17. A method of determining timer values for use by an HDLC Traffic Manager (HTM) state machine in an optical communication network, the method comprising:

sending a first packet to a remote node in an optical communication network;

receiving a second packet from the remote node prior to expiration of a first delay value;

determining a second delay value between the sending and the receiving; and setting timers of the HTM state machine based on the second delay value, the HTM state machine configured to recover from a frame slip event and wherein a first timer is computed as 2 times the sum of the measured delay value and 15 millisecond.

18. The method of claim 17, wherein the frame slip event results from a change of protocol from an OTUk signal to an ODUk signal, where k is not equal to j.

19. The method of claim 17, wherein the frame slip event results from a change of protocol from an OTUk signal to an ODUk signal.

20. The method of claim 17, wherein the frame slip event results from a mode change from a Trail Termination Point signal to a Connection Termination Point signal.

* * * * *